Nov. 12, 1968

A. A. FLICK 3,410,467

DEVICE FOR SUPPLYING A STRIP OF MATERIAL IN
A CONTROLLED STEP BY STEP MOTION TO AN
OPERATING STATION IN A MACHINE

Filed Nov. 9, 1965

INVENTOR.
ANTONIUS AUGUSTINUS FLICK
BY
Karl W. Flocks
attorney

Nov. 12, 1968　　　　　A. A. FLICK　　　　　3,410,467
DEVICE FOR SUPPLYING A STRIP OF MATERIAL IN
A CONTROLLED STEP BY STEP MOTION TO AN
OPERATING STATION IN A MACHINE
Filed Nov. 9, 1965　　　　　　　　　　　　　　4 Sheets-Sheet 3

INVENTOR
ANTONIUS AUGUSTINUS FLICK

BY
ATTORNEY

Nov. 12, 1968 A. A. FLICK 3,410,467
DEVICE FOR SUPPLYING A STRIP OF MATERIAL IN
A CONTROLLED STEP BY STEP MOTION TO AN
OPERATING STATION IN A MACHINE
Filed Nov. 9, 1965 4 Sheets-Sheet 4

INVENTOR
*ANTONIUS AUGUSTINUS FLICK*

BY

ATTORNEY 3,410,467
DEVICE FOR SUPPLYING A STRIP OF MATERIAL IN A CONTROLLED STEP BY STEP MOTION TO AN OPERATING STATION IN A MACHINE
Antonius Augustinus Flick, Rotterdam, Netherlands, assignor to Hunter Douglas International Ltd., Montreal, Quebec, Canada, a corporation of Quebec, Canada
Filed Nov. 9, 1965, Ser. No. 506,944
Claims priority, application Netherlands, Nov. 10, 1964, 6413061
8 Claims. (Cl. 226—32)

ABSTRACT OF THE DISCLOSURE

A device for supplying a strip of material in a controlled step by step motion to an operating station in a machine incorporating a correction mechanism having a slidable carriage connected to both the strip actuating mechanism and a pivoting rod system from the main drive, and which may be adjusted by cooperation of the carriage with abutment cams and connection through the pivoting rod system allowing uninterrupted continuous motion of the main drive.

---

This invention relates to a device for supplying a strip of material in a controlled step by step motion to an operating station in a machine.

This invention relates particularly, but not exclusively, to a device of said type which is to be used in a machine for puching capsules for bottles out of a strip of metal foil on which a repeating printed pattern is formed.

It is an object of the present invention to provide a device of said type, distinguished by a structurally simple embodiment, operating reliably, being accurately adjustable, and having few moving parts and few pivot points.

The present invention relates to a device for supplying a strip of material in a controlled step by step motion to an operating station in a machine so that certain areas of a strip are brought in a correct position at the operating station for an operation to be effected on only said certain areas of the strip, said device incorporating a correction mechanism which automatically compensates deviations existing between the actual locations and the theoretical pitch dimension of said areas on the strip during the operation of the machine, by co-operation with a detection apparatus, by increasing or decreasing the actuating motion of the strip, said correction mechanism having a slidable carriage which on the one hand is connected to the strip actuating mechanism, and on the other hand through a pivoting rod system to the main drive of the machine, with the extent of the stroke of said carriage, which is slidably guided with respect to (a stationary part of) the machine frame, being adjustable at different values by co-operation of said carriage with abutment cams, coupled to a control apparatus which is responsive to said detection apparatus, said control apparatus each time placing the abutting face of that abutment cam in the path of movement of said carriage, which determines the stroke of said carriage at a value adapted to the corrected actuating motion of the strip, and the pivoting rod system being pivotally connected to said carriage thereby permitting a uninterrupted continuous motion of the main drive of the machine, irrespective of what movement of said carriage is blocked by the respective abutment cams.

In a device according to the invention the detection apparatus may be e.g. a photo cell detection apparatus sensing marks which are placed at regular distances along the sides of the strip. When the strip is carried past the photo cell detection apparatus the marks cause signal pulses which are transmitted to the correction mechanism controlling the supply of the strip. The structural embodiment of the photocell detection apparatus itself does not form a part of the present invention and is the subject of the copending application Ser. No. 543,764.

The strip actuating mechanism may be a freewheel coupling, and its structural embodiment itself does not form a part of the invention either and is therefore not described.

The structural embodiment of said control apparatus regulating the abutment cams is not a characteristic part of the present invention either. In the embodiment of the device described below, said apparatus comprises electrically controlled lifting magnets operating on the abutment cams. Instead of an electrical control apparatus however, also a pneumatic, hydraulic or any other suitable apparatus may be used.

A preferred embodiment of the device according to the invention is characterized in that the pivoting rod system is provided with a connecting rod which on the one hand is pivotally connected to the main drive of the machine and on the other hand is pivotally connected to one end of a link which at its other end at a point between the said two pivot points is pivotally connected to the carriage (or a prolongation fixedly attached to the carriage) by a bearing which at the beginning of the stroke of the carriage towards the abutment cams has its centre at the side of the longitudinal centre line of said connecting rod opposite to a (in respect of said carriage) stationary abutting face for said link, co-operating with means for engaging said link with said abutting face at the beginning of that stroke and preventing said link from snapping to the opposite side of said connecting rod until said carriage has engaged an abutment cam during a shifting motion—under the influence of the tractive force exerted on said connecting rod by the main drive and the attending change of the position of said connecting rod—of the terminal pivot point of that connecting rod, and a consequent displacement of the centre line of said rod so that the centre of said bearing is brought at the same side of the longitudinal centre line of said connecting rod with respect to said abutting face.

Particularly by using said preferred embodiment of the device an arrangement is provided which is very simple of design, occupies little room and is accurately adjustable.

The above-mentioned and other characteristics of the device according to the invention as well as the operation of the device will not be described in detail with reference to the description of a preferred embodiment of the device which is represented in the drawings.

FIGURE 6 is a schematic drawing of the machine in relation to the strip and detection apparatus.

Figure 1:
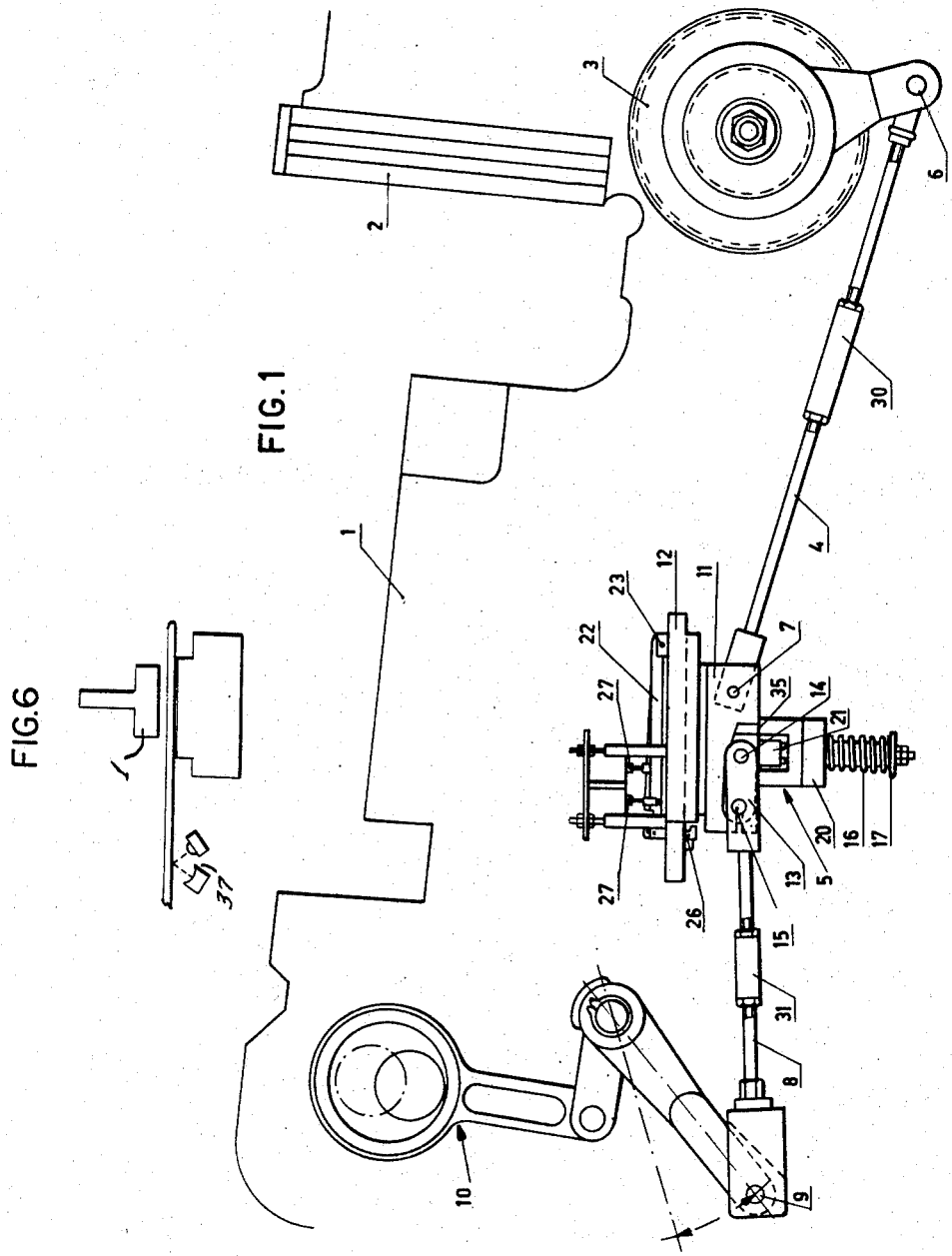
FIGURE 1 is a side view of the device coupled to the free-wheel coupling and to the main drive of the machine which is diagrammatically indicated.

Reference number 1 diagrammatically indicates a punching machine with a guide path 2 for a strip of metal foil from which capsules for bottles are to be punched and on which a repeating pattern is formed. As shown schematically in FIGURE 6, the strip passes photo-cell detection apparatus 37 and then punch 1. The strip actuating mechanism which, as indicated above, may be a freewheel coupling, is indicated with 3. Said mechanism is connected by a straight rod 4 to the correction mechanism 5. The rod 4 is pivotally connected to the free-wheel coupling 3 at 6 and is pivotally connected to the correction mechanism 5 at 7. Also the correction mechanism 5 is pivotally connected by a connecting rod 8 at 9 to the main drive system 10 of the machine which is formed as an eccentric mechanism. The step by step movements (actuating motion) of the metal strip on the guide path 2 caused by the freewheel coupling 3 are derived from the main drive 10 through the correction mechanism 5, the correction mechanism effecting that, without stagnation in the uninterrupted continuous motion of the main drive 10, deviations, if any, existing between the actual locations and the theoretical pitch dimension of the preprinted areas, which must be punched out on the metal strip, are automatically compensated by increasing or decreasing the actuating motion of the mechanism 3. As said earlier, this can be effected by co-operation of the correction mechanism 5 with a detection apparatus (not represented) sensing marks which are placed at regular distances along the edges of the strip, so that the pulses caused by said marks are transmitted to the correction mechanism 5 which accordingly controls the supply of the strip.

The correction mechanism 5 comprises a carriage 11 which in longitudinal direction is slidably guided in a stationary part 12 of the machine frame. The connecting rod 4 is connected at pivot point 4 to one side of the carriage 11. The connecting rod 8 is pivotally connected to the other side of the carriage 11 by means of a link 13. The latter is pivotally connected at its one end at 14 to the end of the connecting rod 8 and is at its other end at 15 pivoted in the bottom part of the carriage 11. This is realized by forming the end of the connecting rod 8 in the shape of a fork, with the link 13 situated between the fork legs, and a journal pin extending through the latter, acting as pivot point 14. Consequently, pivot point 15 is stationary on the carriage 11. Also pivot point 15 is located at the same side of pivot point 14 as pivot point 9.

The pivoting rod system formed by the connecting rod 8 and the link 14 is under the action of a helical spring 16 which is engaged under tension between two plates 17 and is guided on a rod 18 journaled at 19 for axial displacement and oscillation in a prolongation 20 of the carriage 11 and connected to pivot 14 through a yoke 21.

Figure 4:
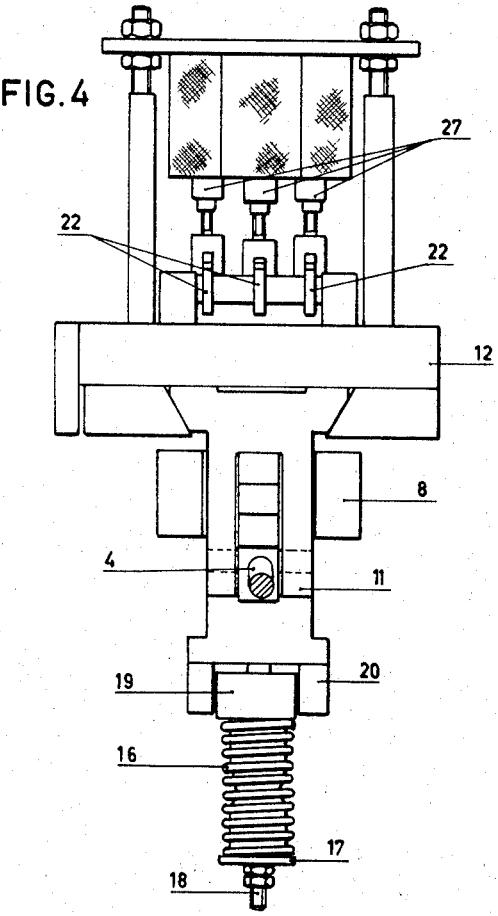
FIGURE 4 is an end view of FIGURE 3 seen in the direction of the arrow in FIGURE 3.

On frame portion 12 three levers 22 are located adjacent each other (see FIGURE 4). Said levers are pivoted at the corresponding one end thereof at 23. At the opposite end thereof the levers each have a projection 24 engaging under a cross pin 25 of an abutment cam 26. Consequently there are three abutment cams 26 adjacent each other, each bearing with its own cross pin 25 on the projection 24 of the respective levers 22 The three abutment cams are vertically slidably guided in the frame. Adjacent its projection 24 each lever 22 is coupled to a lifting magnet. In the represented embodiment the two lifting magnets of the two outer levers are situated adjacent each other, with the lifting magnet of the centre lever being arranged somewhat backwards. The lifting magnets 27 form a part of said control apparatus which responds to signals from the detection apparatus 37. By means of the lifting magnets 27 the abutment cams 26 may independent of each other be lifted so that the abutting face thereof may function as limiting abutment for the stroke of the carriage 11. At the point where the carriage engages with the abutting face of the abutment cams the carriage is provided with a hardened abutment plate 28.

Figure 5:
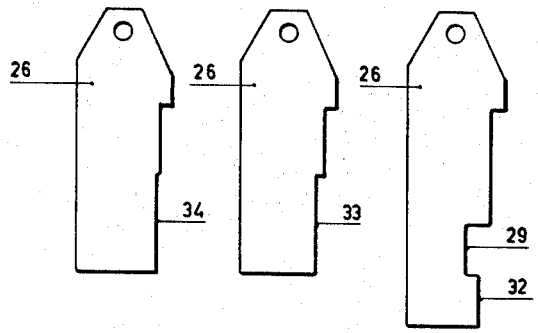
FIGURE 5 shows the three abutment cams applied in the device according to the invention which are located adjacent each other in the machine, but are located behind each other in this figure for the sake of clearness. The operation and embodiment of these abutment cams will be further described in the following.

The three abutment cams 26, represented in FIGURE 5, have the abutting faces 32, 33, 34 thereof, which are directed towards the carriage, relatively staggered so that laterally of the direction of the displacement of the carriage the abutting faces are not aligned but relatively staggered. Above the abutting face 32 the pertaining cam is provided with a recess 29, in which the hardened end piece 28 of the carriage can be received.

Considering further the position of the abutting faces 32, 33, 34 and recess 29 in respect of the carriage, it appears that the recess 29 is located most backwards in respect of the carriage 11, i.e. that when the recess 29 is at the same level of end piece 28 and consequently in its path, the carrier is permitted to make an extra large stroke, i.e. a stroke larger than with the normal actuating motion and corresponding to the unblocked total stroke of the carrier. This large stroke is in the following indicated as the freewheel stroke and is desired to be able to let the strip of material quickly advance at the beginning of or during the operation of the machine to quickly give it a large correction, if necessary. Once the stroke has been corrected, the recess 29 has fulfilled its task.

The mutual position of the abutting faces 32, 33, 34 in respect of the slide is such that the abutting face 34 is somewhat closer to the carrier than the abutting face 33, which in turn is again somewhat closer to the carrier than the abutting face 32. It will be apparent that the abutting face 32 permits a larger stroke than the abutting face 33 and that the latter abutting face in turn permits a larger stroke than the abutting face 34.

The control apparatus effects that each time that particular abutment face is in the path of movement of the carrier which determines the stroke of the carrier at the value required for the correction to be made. If a smaller actuating motion of the machine is necessary than normal, which can also be expressed by stating that the actuating motion must be submitted to a positive correction, the abutting face 34 is in the path of the carrier. The abutment cam with the abutting face 34 may therefore be indicated as a positive cam.

If a larger actuating motion is necessary than normal, which can be expressed by stating that a negative correction must be made, the abutting face 32 is in the path of the carrier. The abutment cam with this abutting face 32 is consequently the so-called negative abutting face. Considering the recess 29 this cam can also be called the freewheel abutment cam.

If no correction of the actuating motion is necessary, the abutting face is in the path of movement of the carrier. The abutment cam provided with this abutting face 33 can be indicated as the zero cam.

Figure 3:
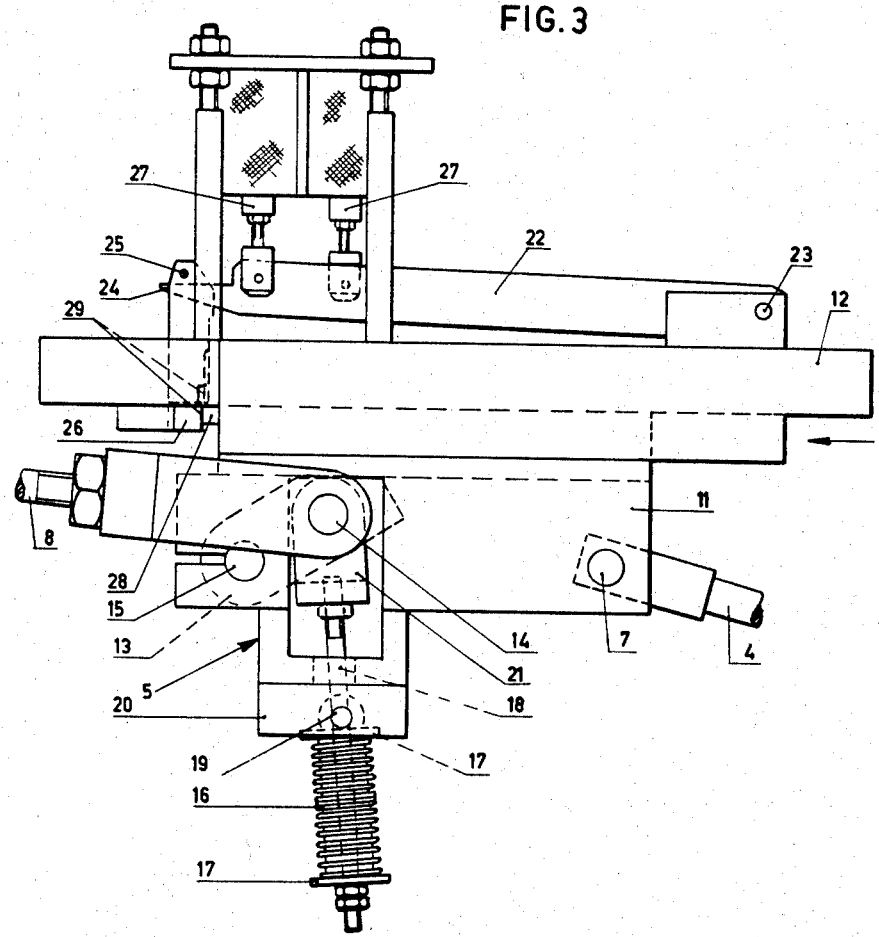
FIGURE 3 is a side view on an enlarged scale of the centre portion of FIGURE 1 in a later stage, relative to FIGURE 2 of the movement of the link, with the abutment cams in a negative correction position of the machine as explained in the following.

As said the control apparatus effects that the desired abutting face is in the path of movement of the carrier. This controls the abutment cams in such a way, also following from the above, that if a negative correction must be made, i.e. with the abutting face 32 in the path of movement of the carrier, the two other abutment cams have been raised by their lifting magnets 27. This situation is represented in FIGURE 3. If a positive correction must be made, i.e. with the abutting face 34 in the path of movement of the carrier, the other two abutment cams do not need to have been raised. With the abutting face 33 in the path of the carrier the abutment cam with the positive abutting face 34 has been raised.

Figure 2:
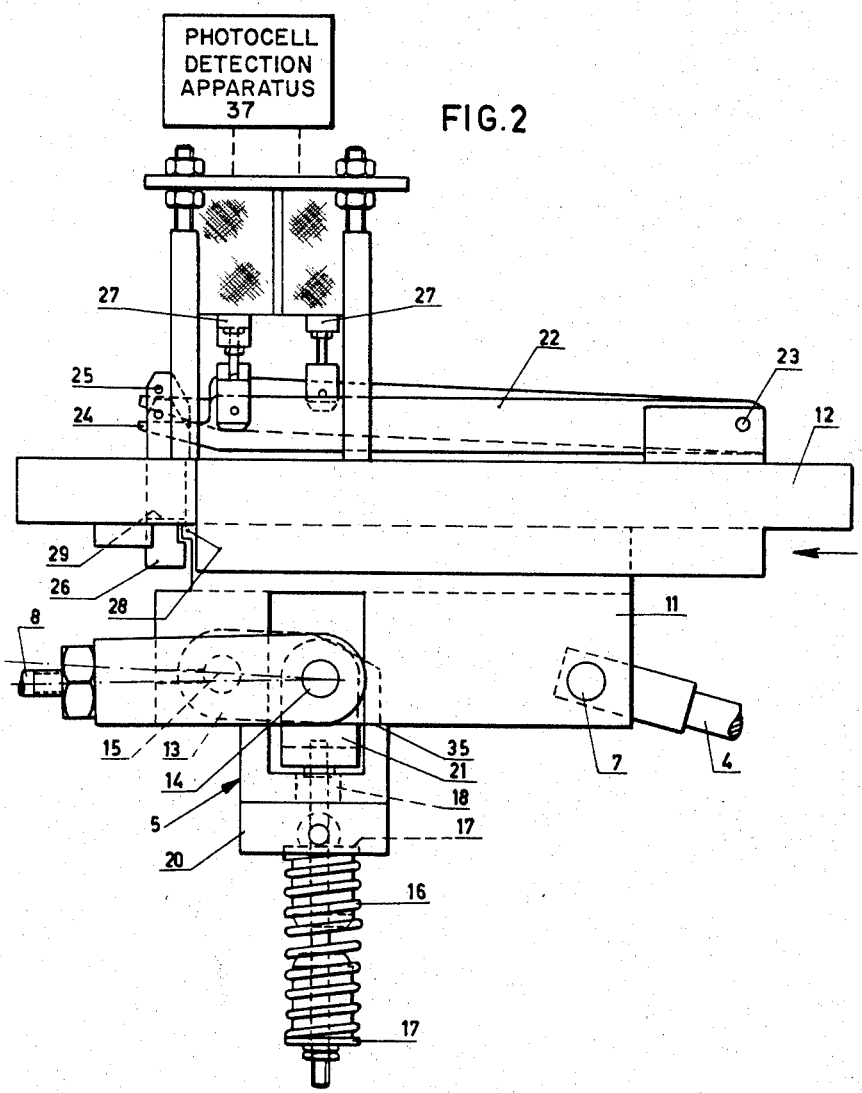
FIGURE 2 is a side view on an enlarged scale of the centre portion of FIGURE 1 with the link in its lowermost abutting position and the abutment cams in the freewheel position of the machine as explained in the following.

In case the machine is in the so-called freewheel position, e.g. with the recess 29 in the path of the end piece 28 of the carrier, which situation is represented in FIGURE 2, the other two abutment cams have been raised.

The pivoting rod system 8, 13 ensures that irrespective of what abutting face engages the carrier 11, the motion of the main drive 10 can continue uninterruptedly along its stationary path of movement. Namely as soon as the movement of the carrier is blocked by contacting an abutting face of an abutment cam, the link 13 is swung upwards by the connecting rod 8 about its pivot point 15 because of the tractive force exerted thereon. This takes place against the action of the helical spring 16 which spring counteracts a rotation of the link 13 about its pivot point 15 until the carrier has been blocked by an abutment cam. In FIGURE 2 the link 13 is represented in its bottom position, bearing with its bottom side against an abutting face 35 (FIGURE 2) which forms a part of the carrier, this in such a manner that in this abutting position at the beginning of the stroke of the carrier the centre of pivot 15 is above the longitudinal centre line of the rod 8. With a continuing stroke of the carrier, with the pivot point 9 moving upwards along the circular arc represented in FIGURE 1, the longitudinal centre line of the rod 8 also shifts in respect of the centre of the pivot point 15 so that finally the centre of pivot point 15 is below the longitudinal centre line of the rod 8 which situation is represented in FIGURE 3. The helical spring 16 prevents in the latter situation a further snapping of the link 13 under the influence of the tractive force acting thereon until the carrier has contacted the abutting face of an abutment cam in its path. When this occurs the tractive force in the rod overcomes the force of the spring 16 and the link is pulled further, i.e. the link is snapping so that the motion of the main drive system 10 can continue uninterruptedly.

The angle over which the link 13 can deviate upwards about its pivot point 15 depends of course on the abutting face which is brought in the path of movement of the carrier 11. The smaller the stroke of the carrier the larger the angle over which the link 13 deviates. By the return movement the spring 16, being released, co-operates in pulling the link 13 again towards the abutting face 35.

As appears from FIGURE 1 an adjusting means 30 is incorporated in the rod 4 and an adjusting means 31 in the rod 8. By way of the adjusting means, here formed as a so-called turns buckle, the length of the rods can be modified. With the adjusting means 31 the position of the carrier 11 relative to the three abutment cams is determined, whereas the adjusting means 30 determines the amount of strip carried through. The latter by determining the starting point of the pivot 6, whereby the angular rotation of the axis of the freewheel coupling can be varied. The location of the pivot 6 on the circle through this point, with the centre of the freewheel coupling for centre, also determines the fine accuracy when adjusting the adjusting means 30.

Although in the embodiment of the device described above and represented in the drawings three abutment cams are applied, the invention is not restricted hereto. The invention namely also comprises the embodiment in which more than one position and more than one negative correction abutment cam are applied, with the advantage that then one can operate with a differentiated correction to both sides.

I claim:

1. A device for supplying a strip of material in a controlled step by step motion to an operating station in a machine so that certain areas of the strip are brought in a correct position at the operating station for an operation to be effected on only said certain areas of the strip, said device incorporating a correction mechanism which inter alia automatically compensates deviations existing between the actual locations and the theoretical pitch dimension of said regions on the strip during the operation of the machine, by co-operation with a detection apparatus, by increasing or decreasing the actuating motion of the strip, said correction mechanism having a slidable carriage which on the one hand is connected to the strip actuating mechanism, and on the other hand through a pivoting rod system to the main drive of the machine, with the extent of the stroke of said carriage, which is slidably guided with respect to (a stationary part of) the machine frame, being adjustable at different values by co-operation of said carriage with abutment cams, coupled to a control apparatus which is responsive to said detection apparatus, said control apparatus each time placing the abutting face of that abutment cam in the path of movement of said carriage, which determines the stroke of said carriage at the value adapted to the corrected actuating motion of the strip, and the pivoting rod system being pivotally connected to said carriage thereby permitting an uninterrupted continuous motion of the main drive of the machine, irrespective of what movement of said carriage is blocked by the respective abutment cams.

2. A device according to claim 1, characterized in that the pivoting rod system is provided with a connecting rod which on the one hand is pivotally connected to the main drive of the machine and on the other hand is pivotally connected to one end of a link which at its other end at a point between the said two pivot points is pivotally connected to the carriage (or a prolongation fixedly attached to the carriage) by a bearing which at the beginning of the stroke of the carrriage towards the abutment cams has its centre at the side of the longitudinal centre line of said connecting rod opposite to and in respect of said carriage stationary abutting face for said link, co-operating with means for engaging said link with the abutment face at the beginning of said stroke and preventing said link from snapping to the opposite side of said connecting rod until the carriage has engaged an abutment cam during a shifting motion—under the influence of the tractive force exerted by the main drive on said connecting rod and the attending change of the position of said connecting rod—of the terminal pivot point of that connecting rod, and a consequent displacement of the centre line of said rod so that the centre of said bearing is brought at the same side of the longitudinal centre line of said connecting rod with respect to the abutment face.

3. A device according to claim 2, characterized in that said means comprise a tension spring engaging the pivoting connecting point of said connecting rod and said link.

4. A device according to claim 1, characterized in that said abutment cams are located adjacent each other in a plane transverse of the path of the movement of the carriage, with said abutting faces of the abutment cams, destined for the carriage, being relatively staggered in the direction of the movement of the carriage.

5. A device according to claim 1, characterized in that one of said abutment cams, particularly that abutment cam which is provided with the abutting face permitting a larger stroke of the carrriage than corresponds with a normal actuating motion, is provided with a recess above its abutting face which recess overruling said abutting face allows a larger stroke, a so-called freewheel stroke, than determined by the respective abutment cams.

6. A device according to claim 1, characterized in that the control apparatus, responsive to the detection apparatus, is provided with a plurality of lifting members, e.g. lifting magnets, corresponding in number to the number of abutment cams, said lifting members each being coupled to a lever which is pivoted on the frame of the machine which engages an abutment cam which is slidably guided in said frame and which is provided with an abutment face, whereby the required abutment face can be moved into, or left in, the path of movement of the said carriage by controlling the positions of the abutment members by means of the lifting members.

7. A device according to claim 2, characterized in that said connecting rod is provided with an adjusting means which by adjusting the length of said rod determines the position of said carriage in respect of said abutment cams.

8. A device according to claim 1, characterized in that the correction mechanism is connected by a rod with the strip actuating mechanism, said rod being provided with an adjustment means which by adjustment of the length of the rod determines the amount of strip carriage throughput.

References Cited

UNITED STATES PATENTS

| | | | |
|---|---|---|---|
| 2,033,857 | 3/1936 | Smith et al. | 226—32 |
| 2,578,960 | 12/1951 | Alger | 226—32 |
| 2,922,641 | 1/1960 | Holler et al. | 226—32 |
| 3,289,507 | 12/1966 | Grewe | 83—209 X |

ALLEN N. KNOWLES, *Primary Examiner.*